(12) United States Patent
Bock et al.

(10) Patent No.: US 8,031,812 B2
(45) Date of Patent: Oct. 4, 2011

(54) METHOD AND CIRCUIT ARRANGEMENT FOR SYMBOL DECISION UPON THE RECEPTION OF A SIGNAL INCLUDING A QUADRATURE SIGNAL PAIR

(75) Inventors: Christian Bock, Freiburg (DE); Stefan Keller, Freiburg (DE)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 951 days.

(21) Appl. No.: 11/894,671

(22) Filed: Aug. 21, 2007

(65) Prior Publication Data

US 2008/0056412 A1 Mar. 6, 2008

(30) Foreign Application Priority Data

Aug. 21, 2006 (DE) .................... 10 2006 038 963

(51) Int. Cl.
*H04L 27/00* (2006.01)
*H04L 5/12* (2006.01)
*H04L 27/06* (2006.01)

(52) U.S. Cl. .................... 375/324; 375/261; 375/341

(58) Field of Classification Search .................. 375/261, 375/322, 324, 340, 341; 329/304
See application file for complete search history.

(56) References Cited

U.S. PATENT DOCUMENTS

| | | | | |
|---|---|---|---|---|
| 5,621,764 A | * | 4/1997 | Ushirokawa et al. | 375/341 |
| 6,421,400 B1 | * | 7/2002 | Rhee et al. | 375/341 |
| 6,654,340 B1 | | 11/2003 | Jones et al. | |
| 6,661,282 B2 | * | 12/2003 | Ha et al. | 329/304 |
| 6,977,972 B1 | * | 12/2005 | Kandala et al. | 375/332 |
| 2001/0031024 A1 | * | 10/2001 | Petersen et al. | 375/335 |
| 2005/0249314 A1 | * | 11/2005 | Bock | 375/322 |
| 2007/0242740 A1 | * | 10/2007 | Kim | 375/341 |

FOREIGN PATENT DOCUMENTS

| | | |
|---|---|---|
| DE | 103 44 756 A1 | 5/2005 |
| EP | 1 343 285 A1 | 9/2003 |
| EP | 1 523 144 A2 | 4/2005 |
| GB | 2 388 760 A | 11/2003 |

OTHER PUBLICATIONS

Hubber, J. "Trelliscodierung." Springer-Verlag, Berlin: 1992. ISBN 3-540-55792-X, S. pp. 99-139.

* cited by examiner

*Primary Examiner* — Betsy Deppe
(74) *Attorney, Agent, or Firm* — DLA Piper LLP (US)

(57) ABSTRACT

The invention relates to a method and a circuit arrangement for deciding a symbol upon the reception of a signal including or coupled with a quadrature signal pair, wherein the decision is made by means of an analysis of the metric of at least one reception point to at least one nominal point in a complex coordinate space, and the metric is analyzed in the non-Cartesian or not exclusively Cartesian complex coordinate space. The decision is made after the analysis, and during the decision process, a second most probable nominal point and a reliability of the decision are determined.

14 Claims, 4 Drawing Sheets

METHOD AND CIRCUIT ARRANGEMENT FOR SYMBOL DECISION UPON THE RECEPTION OF A SIGNAL INCLUDING A QUADRATURE SIGNAL PAIR

RELATED APPLICATIONS

This application claims the foreign priority benefits of German Application No. DE 10 2006 038 963.8, filed Aug. 21, 2006.

FIELD OF THE INVENTION

The invention relates to a method for symbol decision upon the reception of a signal coupled with a quadrature signal pair, or including a quadrature signal pair, and to a related circuit arrangement.

BACKGROUND

During most current transmissions of radio, TV and data broadcasts conducted in particular through a cable or through terrestrial radio, data ise transmitted with a complex digital modulation method such as for example QAM (quadrature amplitude modulation). High-order symbol alphabets, for example according to 256-QAM or 1024-QAM, require a very precise adjustment of the reception in a reception device. In addition to Gaussian noise, the main problem is that a phase noise is created during the adjustment of the reception, which is produced by insufficient mixer and transmitter oscillators. Such phase noise causes statistical fluctuations in the system of coordinates of the received signal.

DE 103 44 756 A1 describes a circuit arrangement for symbol decision upon the reception of a signal coupled with a quadrature signal pair. The circuit arrangement is provided with a coordinate converter for conversion of the signal from Cartesian coordinates to non-Cartesian coordinates, a pre-decision device for determination of a minimal distance between a reception point and at least one corresponding nominal point based on the non-Cartesian signal, and a decision device for deciding a symbol based on the distance analysis. A control device in the circuit arrangement performs in this case a procedure for the determination of a symbol upon the reception of a signal which is coupled with a quadrature signal pair, during which the decision is made with an analysis of the distance of at least one reception point to at least one nominal point in the complex coordinate space. A particular characteristic in such a case is the fact that the distance in non-Cartesian or not exclusively Cartesian complex space is analyzed and a decision is then made based on this analysis. This makes it possible to avoid symbol decisions in a raster with boundaries which are optimized according to Gaussian noise. According to this procedure, decision cells are formed which in contrast to quadrants are widened in the phase direction, as one can see from the difference between FIG. 5 and FIG. 6.

FIG. 5 shows the first quadrant having $64_{[CCB1]}$ QAM with possible symbols or symbol positions, symbol radii and Cartesian decision boundaries. FIG. 6, on the other hand, shows decision boundaries which are widened in the phase direction, as well as possible symbols and symbol radii.

This procedure makes it possible to ensure that a decision will be found not in the Cartesian space, that is to say in the system of I-Q coordinates, but in a system of polar coordinates. While with the Cartesian decision, a distance $\Delta I^2 + \Delta Q^2$ between the digitalized input signal and an alphabet signal is minimized, with the decision in the system of polar coordinates is determined a distance a $|\Delta r| + |\Delta \phi|$, or the distance a $\Delta r^2 + \Delta \phi^2$, or a combination thereof.

Also possible is a combination of systems which takes into account both the parameters which are based on the system of polar coordinates and the parameters which are based on the Cartesian system. The factor a indicates in this case the form of the decision process and it can be adjusted according to reception conditions.

While according to the Cartesian decision, the boundaries are predetermined geometrically, in particular based on quadrant cells, and the decision can be easily realized by cutting off the low-order bits, all the distances must be explicitly calculated for the decision in the system of polar coordinates. To keep the expenditure required for this at a low level, preferably only probable symbols or symbol positions are included in the selection, for example only four possible symbols. An auxiliary decider is used for the selection according to the Cartesian decision type. A grid network of the auxiliary decider is illustrated in FIG. 7. Only four symbols in corner points of each quadrant of the auxiliary grid network are selected in order to make a decision, within which the received symbol is located. Other calculation rules are used for the outer regions.

The application of Viterbi decoders is generally known, and is used to correct an error of a trellis-coded information stream in which not all symbols are possible. In this case, after the reception of a sequence of symbols, the distance to several allowed symbols is compared and the most probable symbol sequence is selected, that is to say a symbol sequence which displays the lowest number of errors. The evaluation of the error is more precise when not only so called "hard" errors are taken into consideration, in which each false bit is evaluated as an error, but when also a "soft" error is considered within the framework of a so called soft decision.

Under the term soft error is referenced the distance which the received and digitalized signal had to the selected symbol, as well as the distance to the next most probable symbol.

The object of the present invention is to obtain an improved circuit arrangement and a method for deciding a symbol upon the reception of a signal which is coupled with a quadrature signal pair, provided with a procedure wherein the distance is analyzed in the non-Cartesian or not exclusively Cartesian complex coordinate space in order to obtain additional information about reliability.

This object is achieved with a method for deciding a symbol upon the reception of a signal coupled with a quadrature signal pair which has the characteristics according to embodiments described herein, and with a circuit arrangement for deciding a symbol upon the reception of a signal coupled with a quadrature signal pair having the characteristics according to embodiments describe herein.

A method for deciding a symbol upon the reception of a signal sd coupled with a quadrature signal pair is thus realized so that the decision is made with an analysis of the metric or of the distance of at least one reception point to at least one nominal point in a space of complex coordinates, and the metric in the non-exclusively Cartesian space of complex coordinates is analyzed and the decision is made on this basis, wherein the reliability of the decision is determined during the decision process.

The decision is preferably considered in a polar coordinate space, wherein for the metric, the Euclidean distance between the reception points and the nominal points is used, and/or a sum or the values of the angular projections and radial projections of the metric between the reception point and at least one nominal point are analyzed.

The reliability is preferably determined by taking into consideration the smallest metric between the reception point relative to both a first nominal point and to a second nominal point. The smallest metrics are in each case determined relative to nominal point for the previous symbol. The second nominal point forms preferably a second most probable point for the decision.

The reliability Z can be with advantage determined according to $$Z = \log\left(\frac{\sum_{A \in M1} P[s=\alpha|R]}{\sum_{A \in M0} P[s=\alpha|R]}\right)$$

with the sum of the conditional probability P[s=A|R] that the symbol α was transmitted if the symbol R was received formed over the set M1 of all transmission symbols which represent a sent value "1", and the corresponding formation of sums over the set M0 of all transmission symbols which represent a "0".

The reliability can be determined in a simple manner according to $$Z = \log\left(\frac{P[s=\alpha 1|R]}{P[s=\alpha 0|R]}\right)$$

with p[s=α1|R] for the probability of a transmission symbol with the transmission value 1 and P[s=α0|R] for the probability of one of the most probable symbols having the transmission value 0.

The reliability Z can be in a particularly preferred version determined according to $$Z=\text{abs}[\text{transmission}](A1-A2)/NF=(A2-A1)/NF$$

wherein A1 is the smallest metric for a most likely symbol position, A2 is second smallest metric for a second most probable symbol position, and NF is a normalization factor. The normalization factor is in this case preferably formed with the second smallest metric or the sum of the metrics or a constant.

Accordingly, preferred is a circuit arrangement for deciding a symbol upon the reception of a signal coupled with a quadrature signal part, provided with a coordinate converter for conversion of the signal from the Cartesian coordinates into non-Cartesian coordinates, and a decision device for deciding a symbol based on a distance analysis of a minimal metric between a reception point and two next most probable nominal points for this point, and a determination of the reliability of the decision. The circuit arrangement is used preferably in order to realize the method described above.

On the other hand, a decision that is per se known in a polar coordinate system is obtained with a corresponding decider or decision process at this time as a criterion for a soft decision$_{[CB2]}$. In this manner, this new type of a decision is thus obtained with additional information for which the next Viterbi code is required.

Advantageous application fields can be found in complex digital modulation methods, such as for example QAM. Similar modulation methods are at this time employed in particular for radio, TV and data services which are transmitted via cable, but also through terrestrial radio.

DETAILED DESCRIPTION

Figure 1:
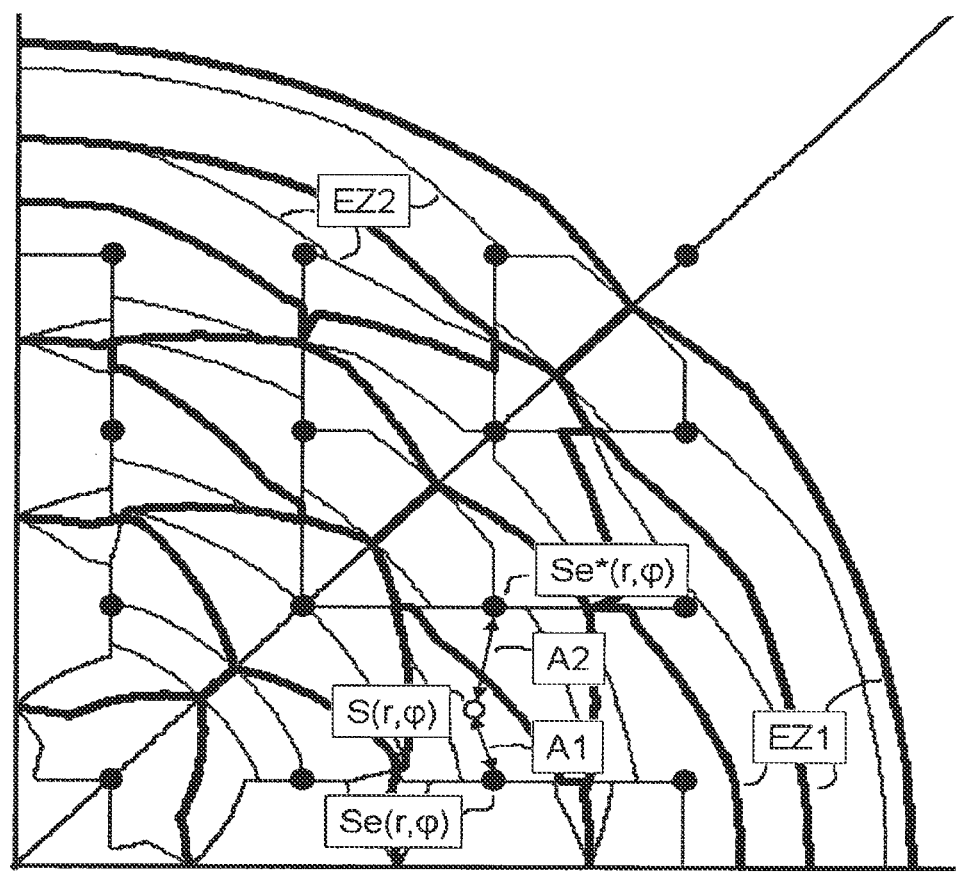
FIG. 1 shows a phase constellation of the first quadrant of 64-QAM with decision cells and decision boundaries, possible symbols and secondary decision boundaries.

FIG. 1 shows a representation of the first quadrant of a 64-QAM system having possible symbols S and symbol positions Se(r,φ), which are represented as points. The first decision boundaries EZ1 are indicated with thick, solid lines, in a manner which is per se known for a decision in a polar coordinate system, in particular from DE 103 44 756 A. In addition, the figure indicates with thin lines second decision boundaries EZ2 for second most probable symbols or symbol positions Se*(r, φ) as secondary decision boundaries. This forms a system consisting of first decision cells for the most probable symbols, and second decision cells for the second most probable cells. A calculation in a system of polar coordinates is preferred for the realization of a decision procedure, wherein a decision can be made with advantage in a combined system with a distance calculation based on polar coordinates, and with a classical distance calculation using Cartesian coordinates. The symbol positions Se(r, φ), Se*(r, φ) of Symbols S are thus preferably considered in polar coordinates.

Figure 2:
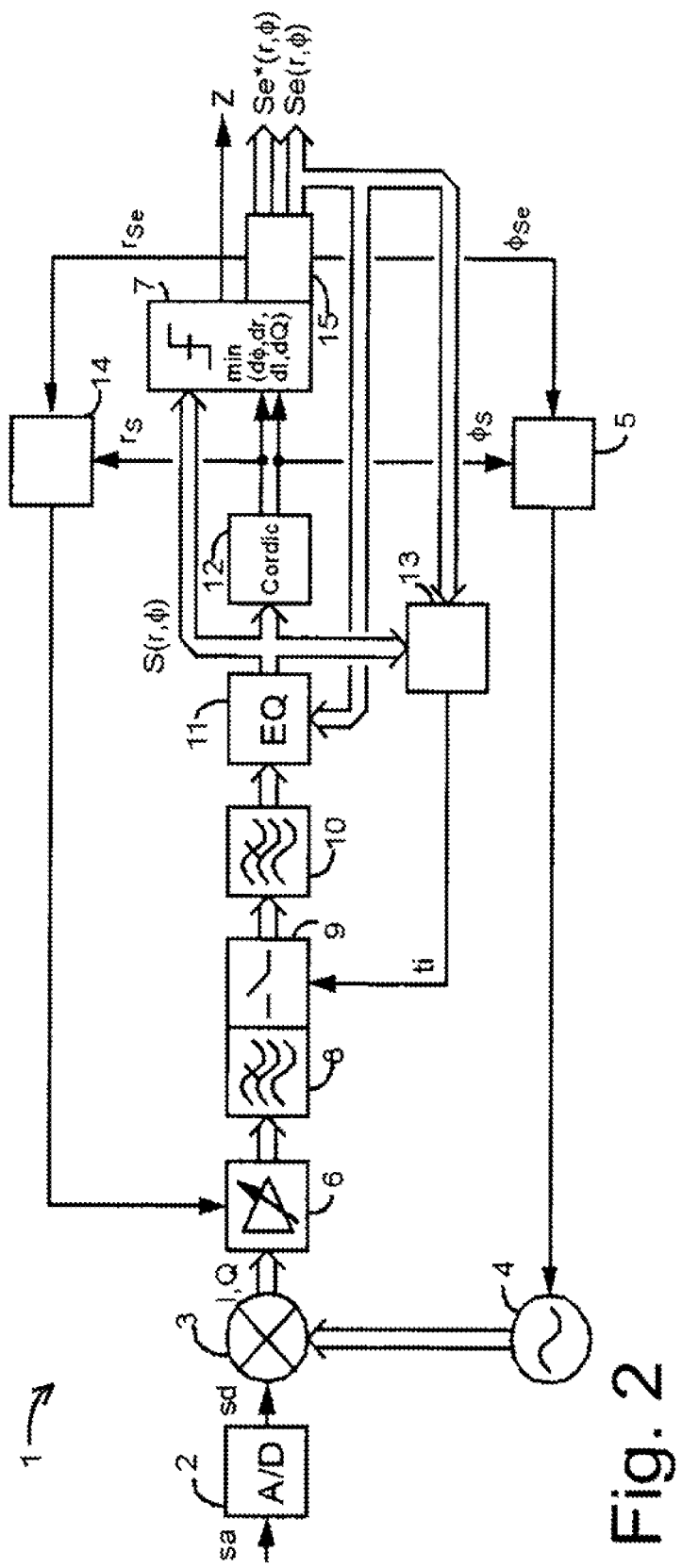
FIG. 2 shows a circuit diagram of an example of a decoder for deciding a symbol.

FIG. 2 shows an example of a circuit arrangement of a demodulator 1, which is used to determine and make a decision about symbols obtained from a digitalized signal sd, which is a quadrature signal pair of a modulation procedure, coupled for example according to a QAM standard. A corresponding circuit arrangement includes a plurality of components, wherein individual components can be omitted or further components can be added depending on the embodiment. In particular, instead of an implementation using individual components interconnected with wiring, an implementation using an integrated circuit arrangement can be also realized. The forwarding of signals or components in the form of real signals, complex signals or individual complex signal components can be also adjusted accordingly depending on the purpose of the application and depending on the specific circuit arrangement.

In the illustrated embodiment, the demodulator 1 receives an analog signal sa from at an input from a signal source, for example a tuner, which is converted by means of an AD converter 2 (AD: Analog/Digital) into digital signal sd. The digital signal sd is supplied to a quadrature converter 3, which converts the digital or digitalized signal sd into the base band. The base band corresponds to the requirements of the demodulator 1 and of the modulation method which is used. Accordingly, the quadrature converter 3 outputs digitalized signal which has been split into both quadrature signal components I, Q of the Cartesian coordinate system. For this frequency conversion, the quadrature converter 3 is normally supplied complex values or two carriers shifted by 90° from a local oscillator 4, whose frequency and phase is controlled by a carrier control device 5.

In another embodiment, the quadrature converter 3, which is realized here as an analog circuit, is located in the path of the analog signal sa. In this case, a local oscillator 4 also outputs two analog carriers shifted by 90° and two A/D converters are required in order to digitize both quadrature signal components I, Q.

The quadrature signal components I, Q, which are output from the quadrature converter 3, or in the other embodiment from both A/D converters, are supplied to a controllable amplifier 6. The control of the controllable amplifier 6, which can be applied also in another location of the signal path, serves to utilize as much as possible and in an optimal manner the operating range of a symbol decider 7. The quadrature signal components I, Q are supplied before or after the amplification by the controllable amplifier 6 to a low-pass filter 8, which is used to eliminate interfering harmonic waves.

The quadrature signal I, Q, amplified and filtered in this manner, or both individual quadrature signal components I, Q, are then furnished to a signal sampling device 9, which is equipped with a symbol sampling device. The control of the symbol sampling device 9 is performed through an input to which is supplied a sampling signal ti. The symbol sampling time points of the sampling signal ti are oriented during normal operation to the symbol rate 1/T and usually also to the exact clock phase status of the received digital signal sd. Since in the illustrated embodiment, the required digitalization timing of the A/D converter is not identical to or synchronized with the sampling signal ti, a temporal interpolation usually takes place between the real sampling values based on the symbol rate or an integral multiple thereof.

In another embodiment, the clock of the sampling of the A/D converter 2 corresponds to the symbol rate 1/T or a multiple thereof. In this case, the clock control device controls the sampling clock of the A/D converter 2 and the sampling device 9 is not necessary.

The output signal of the sampling device 9 is filtered by means of a low-pass filter 10 with a Nyquist characteristic and supplied to an equalizer 11. The equalizer 11 removes interfering distortions from both components of the quadrature signal pair I, Q and provides at its input a provisional symbol $S(r, \phi)$.

A coordinate converter 12, to which the provisional symbol $S(r, \phi)$ is furnished, is used in order to provide the polar coordinates $r_s$, $\phi_s$ of the provisional symbol $S(r, \phi)$.

In the coordinate converter 12, which can be constructed in particular as a CORDIC, is performed a conversion from the complex signal supplied in Cartesian coordinate system, that is to say from the sampled quadrature signal pair I, Q, into the polar coordinates r, $\phi$. With the polar coordinates is thus formed a radius component r and an angle component $\phi$ according to I=r cos ($\phi$) and Q=r sin ($\phi$). Other methods for conversion or shifting between various representation systems known from the sphere of processing of digital signals can be also employed.

While according to the description of the circuit arrangement shown in FIG. 2, a conversion device 3 was used to convert the digital signals sd into the complex Cartesian space I, Q, as well as an additional coordinate converter 12, which was used for conversion into polar coordinates, other circuit arrangements are also possible according to which the first converter itself converts the digital signal sd into a complex signal with polar coordinates r, $\phi$.

After that, so called decided symbols Se(r, $\phi$) are formed from the provisional symbols S(r, $\phi$) or from their polar coordinates $r_s$, $\phi_s$ by the symbol decider 7.

The coordinate conversion device 15 produces the information received from the symbol decider 7 with the decided symbol Se(r, $\phi$) in Cartesian coordinates $I_{Se}$, $Q_{Se}$ and polar coordinates $r_{Se}$, $\phi_{se}$. This is preferably performed with a table, but it can be also performed by a CORDIC or with another algorithm for conversion of coordinates.

These symbols Se(r, $\phi$) and/or their radial components $r_{Se}$ or their desired phase $\phi_{Se}$ are then supplied, directly or indirectly, to other digital signal processing devices, such as in particular a Viterbi decoder connected in series, and preferably also to the decision feedback control circuits or components in the demodulator 1. In this manner, the various corresponding symbol components $r_{Se}$, $\phi_{Se}$ are supplied in particular to the equalizer 11, to the amplification control device 14, to the carrier control device 5 and to the timing control device 13. These control circuits are in this case provided, depending on the arrangement of the circuit, with both quadrature signal components $I_{Se}$, $Q_{Se}$ of the symbol Se(r, $\phi$) in the Cartesian coordinates or in polar coordinates. Another possibility, depending on the arrangement of the circuit, is to supply to individual structural element only one of the quadrature signal components, for example in the case of a carrier control device 5 the angle $\phi_{Se}$ or the phase in polar coordinates, or to supply to the amplification device 14 the radius information or the amplitude information $r_{Se}$ in polar coordinates.

The carrier control device 5 receives the angle component $\phi_S$ of the provisional symbol and $\phi_{Se}$ of the decided symbol, and supplies control voltage to the local oscillator 4.

A clock control device 13, which is used to provide a sampling signal ti, obtains the provisional symbol S(r, $\phi$) in addition to the decided symbol Se(r, $\phi$). The clock control device 13 generates the sampling signal ti, which is in particular input to the symbol sampling device 9.

In order to control the controllable amplifier 6, a corresponding control signal is input to the amplifier from an amplitude control device 14. The amplification control device 14 obtains in addition to the radial component $r_{Se}$ of the decided symbol Se(r, $\phi$) the radial component $r_s$ of the provisional symbol S(r, $\phi$) so that control is exercised depending on the momentary status of the radial components $r_s$, $r_{Se}$ before or after the symbol decider 7.

To the symbol decider 7 are preferably input not only the polar coordinates $r_s$, $\phi_s$, but also the symbols in the Cartesian complex coordinate space $I_S$, $Q_S$ to make it possible to carry out a provisional decision with an auxiliary decider for a limited number of symbols that should be taken into consideration in the space of the polar coordinates and/or a combined decision. The symbol decider 7 can also optionally have access to comparison data which is stored in a storage device according to a method that is per se known.

In order to control the clock control device 13 and the other components of the demodulator 1, such components are connected to a control device, not shown in the figure. The control device implements operations according to an orderly sequence and controls the individual components and sequences according to hardware and/or software based instructions. The control device can be preferably also partially or completely integrated with the functions of the individually named components.

As one can clearly see from FIG. 1, a distortion of the decision cells is created when a deviation occurs in one of the polar coordinate systems.

The decisions of the symbol decider 7 are preferably carried out according to the distorted representation form of the decision cells depicted in FIG. 1, wherein allocations of the received signal to a nominal points Se(r, $\phi$) are carried out in a manner which is known from DE 103 44 756 A1.

According to a preferred embodiment, the demodulator additionally also serves to provide a criterion of the reliability, as well as a second most probable symbol, wherein a Viterbi decoder connected in series makes it possible to arrive at a better estimate of the most probable reception sequence of transmitted symbols. A corresponding reliability Z can be generally defined with:

$$Z = \log\left(\frac{\sum\limits_{A \in M1} P[s = \alpha | R]}{\sum\limits_{A \in M0} P[s = \alpha | R]}\right) \quad (1)$$

wherein there is created the sum of the conditional probabilities P[s=A|R] that the symbol α was transmitted if the symbol R was received. All transmission symbols are summed over the set M1 representing one transmitted value "1". Division is performed with the corresponding sum formed using the set M0 of all transmission symbols which represent a "0".

The metrics are in any case calculated in the symbol decider 7, which carries out decisions in a polar coordinate system, for several symbols of the used symbol alphabet based on the distance of the received signal to each symbol or its symbol position Se(r, φ), wherein the decision which has the first, smallest metric, for example A1=a|Δr1|+|Δφ1| is selected as the correct decision.

In addition, also the second smallest distance to another symbol is determined according to the procedure as a second metric A2=a|Δr2|+|Δφ2|, which corresponds to the second most probable symbol or its symbol positions Se*(r, φ), and which can be also output by the coordinate converter 15, in particular, to a Viterbi decoder connected in series. With the thin lines are in FIG. 1 sketched the second decision boundaries EZ2 of these second most probable symbols or of symbol positions Se*(r, φ), wherein the number of the symbols that can be taken into consideration by the auxiliary decider is in FIG. 1 limited to four.

During the selection of the second most probable symbol, attention is preferably paid to ensure that symbols in other quadrants are also taken into consideration. A procedure for deciding a symbol is thus carried out with a signal sd coupled with a quadrature signal pair I, Q, wherein the decision is made based on an analysis of the distance of at least one reception point S(r, φ) to at least one nominal point Se(r, φ) in a complex coordinate space, and the distance in the not exclusively Cartesian complex coordinate space is analyzed and the decision is then made based on this analysis, so that during the decision process in the decider 7, a reliability Z of the decision is obtained, which is also output to a Viterbi decoder connected in series.

In order to obtain the metric of the reliability information, Formula (1) can be further simplified with the assumption that only the respective most probable symbol positions Se (r, φ), Se* (r, φ) contribute to the logarithm sum as shown below.

$$Z = \log\left(\frac{P[s = \alpha 1 | R]}{P[s = \alpha 0 | R]}\right) \quad (2)$$

The metric A1 thus supplies a criterion for the probability of a symbol α(q). If it is assumed that the second metric A2 does not result in a contrary bit decision, that is to say when it represents a symbol α(1−q), then the reliability Z can be derived from the metrics A1 and A2 of both probability functions according to $$Z=\log(P[s=\alpha 1|R])-\log(P[s=\alpha 0|R])=g(A2,A2) \quad (3)$$

or $$Z=\log(P[s=\alpha 1|R])-\log(P[s=\alpha 0|R])=f(A1)-f(A2) \quad (4)$$

A simple probability for the determination of the reliability Z for the with the Viterbi decoder can be obtained from a calculation according to $$Z=\text{abs}[\text{transmission}](A1-A2)/NF=(A2-A1)/NF \quad (5)$$

wherein the amount of the difference between both metrics A1, A2 is divided by a normalization factor NF, which can for example correspond to the sum of both metrics A2+A1, or to the second metric A2, or to a constant.

Figure 3:
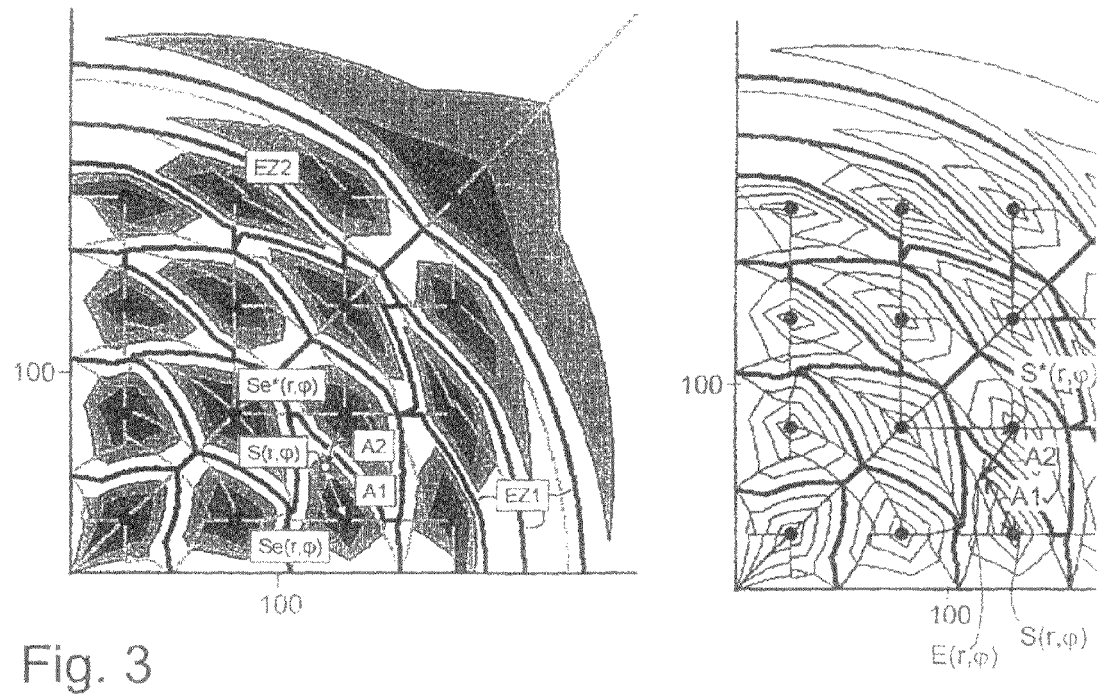
FIG. 3 shows a phase diagram of the first quadrant used to provide an illustration of a first normalization factor.

FIG. 3 shows an example of the first quadrant for the first of these normalization factors NF, which is created from the sum of both metrics A1+A2. The first or primary decision boundaries EZ1 are represented by thick lines, while the second or secondary boundaries EZ2 of the second most probable symbols or their symbol positions are represented by the thin lines within the first decision boundaries. The probability of the correct reception is indicated by the intensity of the gray scales, wherein darker-illustrated regions indicate a small deviation of the digitalized signal S from the decided symbol Se.

Figure 4:
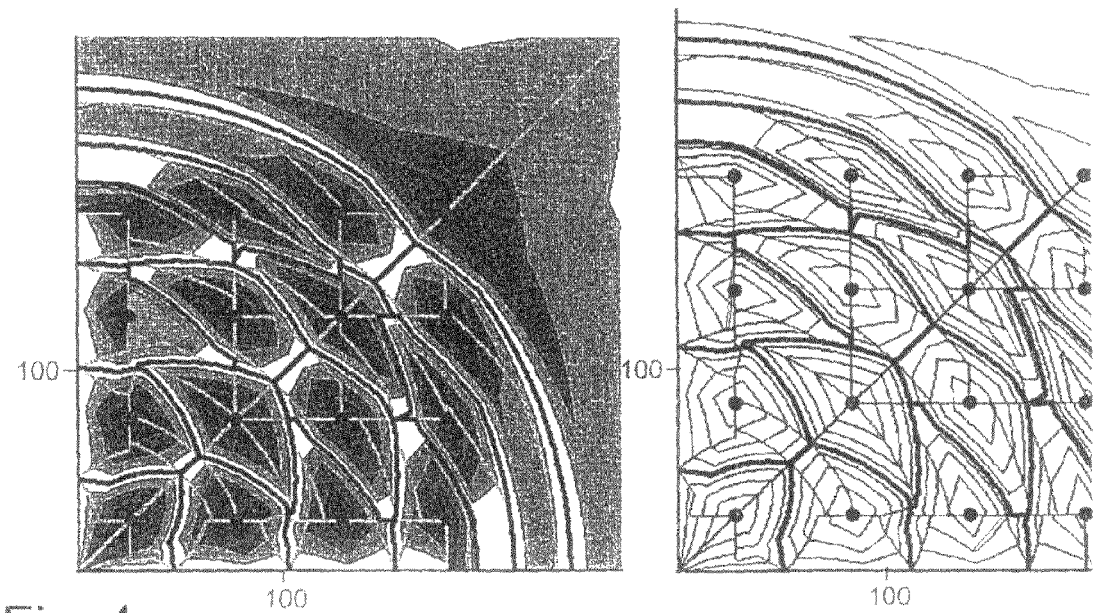
FIG. 4 shows a similar phase diagram of a second normalization factor.
Figure 5:
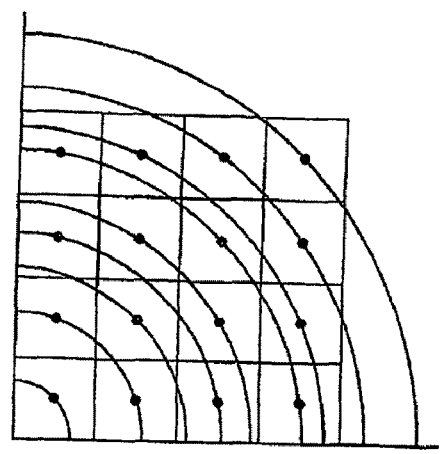
FIG. 5-7 are diagrams illustrating decision boundaries based on a method according to prior art.
Figure 6:
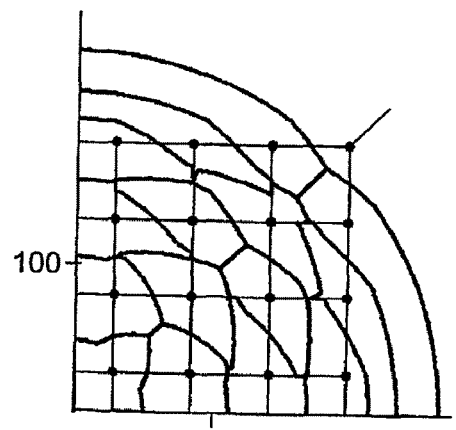
Figure 7:
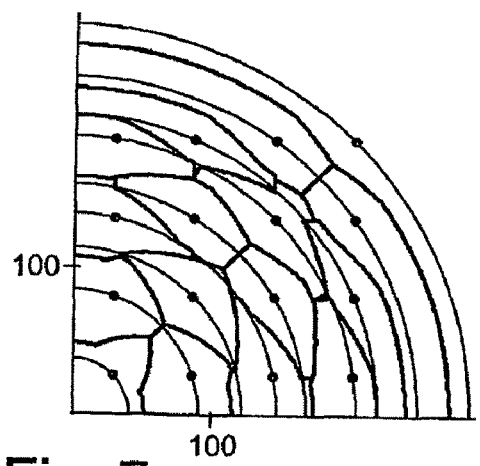

FIG. 4 shows an example of the first quadrant for the second example of a normalization factor NF, which is set so that it equals the second metric A2.

What is claimed is:

1. A method for deciding a symbol of a signal which is coupled with a quadrature signal pair, comprising
    performing, using a circuit arrangement, an analysis of a metric of at least one received point related to at least one nominal point in a complex coordinate space, said analysis including an analysis of the metric based on at least a radial component and an angular component in a non-Cartesian or not completely Cartesian complex coordinate space;
    making, using the circuit arrangement, a decision based on the analysis; and
    determining, using the circuit arrangement, a reliability of the decision based on at least the radial component and the angular component.

2. The method according to claim 1, wherein the decision is analyzed in a polar coordinate space, and wherein the Euclidean distance between the received point and nominal points or the values of the angle and radius projections are used as the metric between the received point and at least one nominal point.

3. The method according to claim 1, wherein the reliability is determined based on a smallest metric from the received point to each of first and second nominal points.

4. The method according to claim 3, wherein each of the smallest metrics to the nominal points is determined for the received symbol.

5. The method according to claim 3, wherein the second nominal point generates the second most probable symbol for the decision.

6. The method according to claim 1, wherein the reliability Z is determined according to $$Z = \log\left(\frac{\sum_{A \in M1} P[s = \alpha \mid R]}{\sum_{A \in M0} P[s = \alpha \mid R]}\right)$$

wherein the sum of the conditional probabilities P[s=A|R] that the symbol a was transmitted if the symbol R is received is formed over the set MI of all transmission symbols which represent a transmitted value "1", and wherein a corresponding sum is formed over the set MO of all transmission symbols which represent "0".

7. The method according to claim 1, wherein the reliability Z is determined according to $$Z = \log\left(\frac{P[s = \alpha1 \mid R]}{P[s = \alpha0 \mid R]}\right)$$

wherein P[s=a1|R] is the probability of the most probable transmission symbol with the transmitted value 1 and P[s=a0|R] is the probability of the most probable transmission symbol with the transmitted value 0.

8. The method according to claim 1, wherein the reliability Z is determined according to Z=abs[transmission]*(A1−A2)/NF=(A2−A1)/NF* wherein abs is an absolute value function, A1 is the smallest metric for a most probable symbol position, A2 is a second smallest metric of a second most probable symbol position, and NF is a normalization factor.

9. The method according to claim 8, wherein the normalization factor is formed with the second smallest metric, or the sum of the metrics, or a constant.

10. A circuit arrangement for deciding a symbol of a signal coupled with a quadrature signal pair, comprising
    a coordinate converter configured to convert the signal from Cartesian coordinates into non-Cartesian coordinates and
    a decision device for deciding a symbol on the basis of a distance analysis of a minimal metric, based on at least a radial component and an angular component, between a reception point and two next most probable nominal points thereof, and determining a reliability of the decision based on at least the radial component and the angular component.

11. The circuit arrangement according to claim 10, wherein the reliability Z is determined according to $$Z = \log\left(\frac{\sum_{A \in M1} P[s = \alpha \mid R]}{\sum_{A \in M0} P[s = \alpha \mid R]}\right)$$

wherein the sum of the conditional probabilities P[s=A|R] that the symbol a was transmitted if the symbol R is received is formed over the set MI of all transmission symbols which represent a transmitted value "1", and wherein a corresponding sum is formed over the set MO of all transmission symbols which represent "0".

12. The circuit arrangement according to claim 10, wherein the reliability Z is determined according to $$Z = \log\left(\frac{P[s = \alpha1 \mid R]}{P[s = \alpha0 \mid R]}\right)$$

wherein P[s=pt1|R] is the probability of the most probable transmission symbol with the transmitted value 1 and P[s=a0|R] is the probability of the most probable transmission symbol with the transmitted value 0.

13. The circuit arrangement according to claim 10, wherein the reliability Z is determined according to Z=abs[transmission]*(A1−A2)/NF=(A2−A1)/NF* wherein abs is an absolute value function, A1 is the smallest metric for a most probable symbol position, A2 is a second smallest metric of a second most probable symbol position, and NF is a normalization factor.

14. The circuit arrangement according to claim 13, wherein the normalization factor is formed with the second smallest metric, or the sum of the smallest and second smallest metrics, or a constant.

* * * * *